May 5, 1970 W. N. HALL 3,510,807
ELECTRONIC SWITCH USING A SERIES STRING OF TWO DIODES, ONE ZENER AND ONE CONVENTIONAL, AND A CAPACITOR IN PARALLEL WITH A RESONANT CIRCUIT AS A Q SPOILER
Filed Sept. 29, 1966
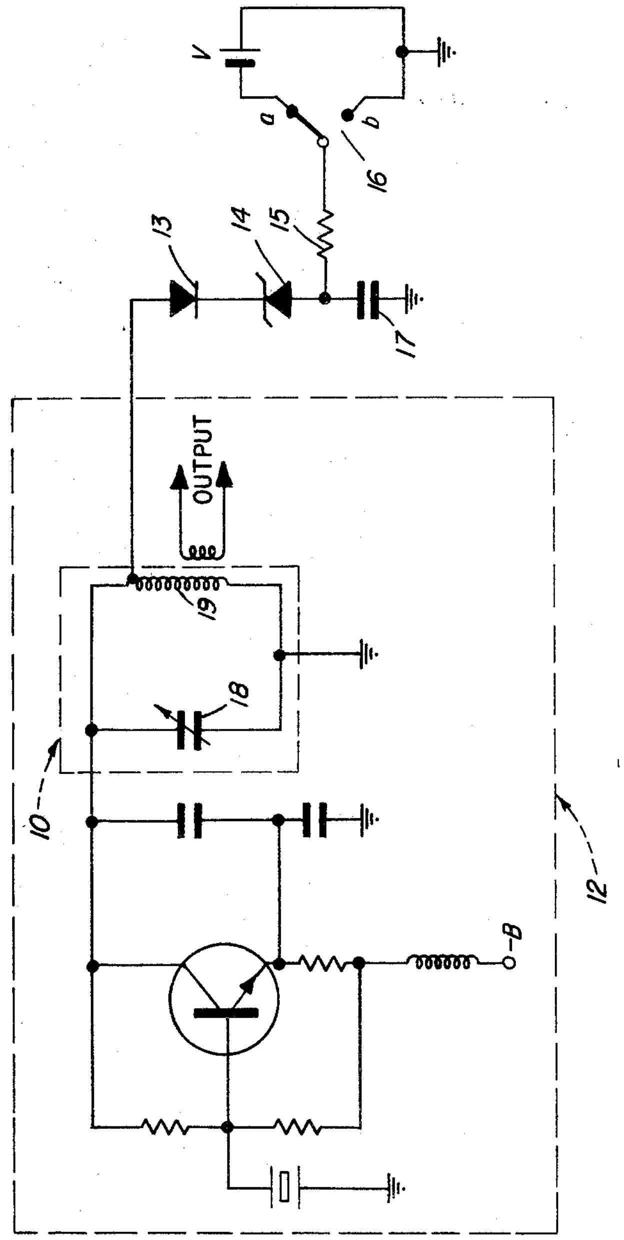
INVENTOR
WAYLAND N. HALL
BY
ATTORNEY United States Patent Office 3,510,807

Patented May 5, 1970

3,510,807

ELECTRONIC SWITCH USING A SERIES STRING OF TWO DIODES, ONE ZENER AND ONE CONVENTIONAL, AND A CAPACITOR IN PARALLEL WITH A RESONANT CIRCUIT AS A Q SPOILER

Wayland N. Hall, Nashua, N.H., assignor, by mesne assignments, to the United States of America as represented by the Secretary of the Navy Filed Sept. 29, 1966, Ser. No. 583,505
Int. Cl. H03j 3/20; H03h 7/12; H03k 17/74
U.S. Cl. 334—40 3 Claims

ABSTRACT OF THE DISCLOSURE

The present invention relates to an electronic switch which may be applied to any resonant circuit wherein electronic spoiling of the circuit Q is desired. A conventional diode has its cathode connected to the cathode of a Zener diode which has its anode connected to one plate of a capacitor which offers a low impedance to alternating current signals. The other plate of the capacitor is connected to ground. The anode of the conventional diode is connected to a point on a resonant circuit which effectively connects the series string of the two diodes and capacitor in parallel with the resonant circuit. A current limiting resistor is connected between the anode of the Zener diode and the capacitor. A negative D.C. voltage supply is connected to the anode of the Zener diode by way of the current limiting resistor. The magnitude of the D.C. voltage supply is insufficient to breakdown the Zener diode. When the D.C. voltage is turned on, the Zener diode breaks down causing the conventional diode to break down also, thereby providing a shunt path to ground. Thus, by turning on the D.C. voltage, the overall impedance of the circuit may be adjusted so as to detune the resonant circuit.

The present invention relates to an electronic switch and, more particularly, to a device for switching a circuit between its resonant and non-resonant state.

Those concerned with the development of electronic switches for resonant circuits have long recognized the need for an electronic radio frequency switch which is compact in size and operable from low power, single polarity input commands. Prior art switches include mechanical relays which exhibit the characteristics of slow response, lower reliability, high drive current requirements and bulkiness.

The purpose of the present invention is to provide an electronic switch for a resonant circuit which embraces all the advantages of similarly employed prior art devices and possesses none of the aforedescribed disadvantages. To attain this, the present invention contemplates the use of a Zener diode and a conventional semiconductor diode arranged back-to-back and in shunt across a resonant circuit. A D.C. voltage source is aranged in such a manner that upon its application to the Zener diode, it breaks down the Zener diode. When the Zener diode breaks down, it shorts out signals of one polarity applied to the resonant circuit to ground thereby spoiling the Q of the resonant circuit. The Q of the circuit is the ratio of the reactance to the resistance of the circuit. When the Q is high or the ratio of the reactance to the resistance is high, the circuit tends to resonate. The circuit may be switched out of resonance by reducing the reactance of the circuit. The present invention performs this function more rapidly than prior art devices by switching on a single polarity command voltage. In addition, it is smaller and lighter than prior electronic switches and, since all of the components are solid state components, the device is more reliable and has lower current requirements than prior art devices.

Accordingly, it is an object of the present invention to provide means to switch a resonant circuit between its resonant and non-resonant state.

Another object of the present invention is to provide lightweight means to rapidly de-tune a resonant circuit on a single polarity command voltage.

A further object of the present invention is the provision of reliable means having low current requirements for spoiling the Q of a resonant circuit.

Other objects, advantages and novel features of the present invention will become apparent from the following detailed description of the invention when considered in conjunction with the accompanying drawings wherein the figure discloses an embodiment of the present invention.

Referring now to the drawing, the invention is shown to be operative in conjunction with a simple Miller oscillator 12 having a resonant circuit 10 comprising variable capacitor 18 and inductor 19. However, the present concept is not limited to use in oscillator circuits only. It may, for example, be applied to any resonant circuit where electronic spoiling of the circuit's Q is desirable. Such an application might be in tuned coupling networks between amplifiers, for example, where on-off switching of the transmission of the amplifier and/or gain and/or bandwidth is desired. The switching arrangement involved in the present invention is directed primarily to diodes 13 and 14. The cathode of diode 13 is connected to the cathode of Zener diode 14 and anode of which is connected to either ground or a D.C. source through current limiting resistor 15 and single-pole, double-throw switch 16 having positions *a* and *b*. A capacitor 17 which offers low impedance to radio frequency signals is connected between the anode of Zener diode 14 and ground. The negative polarity of a D.C. voltage source may be connected by switch 16 depending on the position of the switch. Voltage source V through switch 16 has been shown, for illustration, as the input control. The advantages of this electronic switch are normally derived by utilizing bias control from electronic circuits.

The anode of diode 13 may be connected to any point on the resonant circuit where a low impedance condition is sufficient for stopping energy build-up in the resonant circuit. In order to switch circuit 10 to its resonant state, switch 16 need only be connected to position *b* which is ground. The positive half cycle in resonant circuit 10 is impeded by Zener diode 14 and the negative half cycle is impeded by diode 13. Therefore, the switch offers high impedance to ground and the Q of circuit 10 is high. Under such conditions, oscillatory energy in circuit 10 causes the circuit to resonate. Circuit 10 may be switched out of resonance by moving switch 16 to position *a* thereby applying a D.C. voltage through current limiting resistor 15 sufficiently negative to reverse bias Zener diode 14 to its breakdown point. The D.C. circuit is completed through inductor 19. At this point, Zener diode 14 breaks into heavy conduction transferring the negative voltage to the cathode of diode 13. This action forward biases diode 13 and it too conducts. The two conducting diodes in series with capacitor 17, chosen for low reactance at the operating frequency, thus form a low impedance shunt across the resonant circuit. Since the resonant circuit is heavily loaded by this low impedance shunt, its Q is reduced below the value necessary to support energy build-up sufficient to sustain oscillation. The oscillation stops and circuit 10 remains de-tuned out of resonance until switch 16 is again switched to position *b* which is ground.

Diode 13 is selected for low junction capacitance and high forward conductance. Zener diode 14 is selected for low junction capacitance and a breakdown voltage that is compatible with the magnitude of the available switching voltage. Since the threshold voltage at which the oscillator turns off depends on the avalanche voltage of Zener diode 14, any desired threshold can be implemented by selection of a Zener diode with the desired avalanche rating. Furthermore, the two diodes need not be connected with the polarity shown. Both may be reversed in polarity to reverse the polarity and threshold requirements of the on-off control voltage input. Thus, the circuit may be arranged so that a positive voltage connected to the cathode of the Zener diode will transform the circuit out of resonance with the ground potential remaining as the on command.

The switch has been shown and described in conjunction with a parallel resonant circuit. The switch can be used in conjunction with a series resonant circuit by simply connecting the switch in parallel with the inductive and capacitance elements of the series resonant circuit.

Obviously many modifications and variations of the present invention are possible in the light of the above teachings. It is therefore to be understood that within the scope of the appeneded claims the invention may be practiced otherwise than as specifically described.

What is claimed is:

1. An electronic switch capable of switching a high Q tuned resonance circuit out of its state of resonance comprising:

- a Zener diode and a conventional diode in series and in an opposing polarity relationship connected in parallel with said resonance circuit;
- a biasing means connected to said Zener diode to break down said Zener diode; and
- a capacitive reactance operative in conjunction with said Zener diode and conventional diode by offering low impedance to oscillatory signals whose frequency is in the order of magnitude of the operating frequency of said resonant circuit and operative in conjunction with said biasing means to offer high impedance to said biasing means.

2. The electronic switch of claim 1 wherein said biasing means comprises a DC voltage source for producing a small signal of either positive or negative polarity capable of biasing said Zener diode and conventional diode to a conducting state.

3. The electronic switch of claim 2 further comprising current limiting means for limiting current between said DC voltage source and said Zener diode.

References Cited

UNITED STATES PATENTS

| | | | |
|---|---|---|---|
| 1,718,138 | 6/1929 | Grimditch | 334—40 X |
| 2,386,515 | 10/1945 | Swart | 331—49 X |
| 2,854,651 | 9/1958 | Kircher | 307—318 X |
| 2,900,455 | 8/1959 | Fredrick et al. | 330—51 |
| 2,918,629 | 12/1959 | Bussard | 330—51 |
| 2,961,553 | 11/1960 | Giger | 331—172 X |
| 3,159,799 | 12/1964 | Cooper | 307—318 X |
| 3,200,350 | 8/1965 | Sharp | 331—166 |
| 3,235,775 | 2/1966 | Winston | 307—318 X |
| 3,264,566 | 8/1966 | Kaufman et al. | 307—259 X |
| 3,428,831 | 2/1969 | Ressler | 307—318 X |

FOREIGN PATENTS

| | | |
|---|---|---|
| 612,264 | 1/1961 | Canada. |
| 1,267,593 | 6/1961 | France. |

OTHER REFERENCES

Millman, Jacob, et al.: "Pulse, Digital, and Switching Waveforms," sec. 16–5, "An Astable Transistor Blocking Oscillator (Diode Controlled)," pp. 609–613, and 626.

Harris, Paul E.: "Radar Boxcar Circuits Using Nuvistors, Transistors, and Zeners," Electronics, Sept. 15, 1961.

HERMAN KARL SAALBACH, Primary Examiner

W. N. PUNTER, Assistant Examiner

U.S. Cl. X.R.

307—318; 34—47